June 5, 1962     L. E. NICHOLSON     3,037,339

POWER LAWN MOWER GRASS CATCHER

Filed Jan. 26, 1959     3 Sheets-Sheet 1

INVENTOR.
LAURENCE E. NICHOLSON
BY
Reynolds, Beach & Christensen
ATTORNEYS

June 5, 1962  L. E. NICHOLSON  3,037,339
POWER LAWN MOWER GRASS CATCHER
Filed Jan. 26, 1959  3 Sheets-Sheet 2
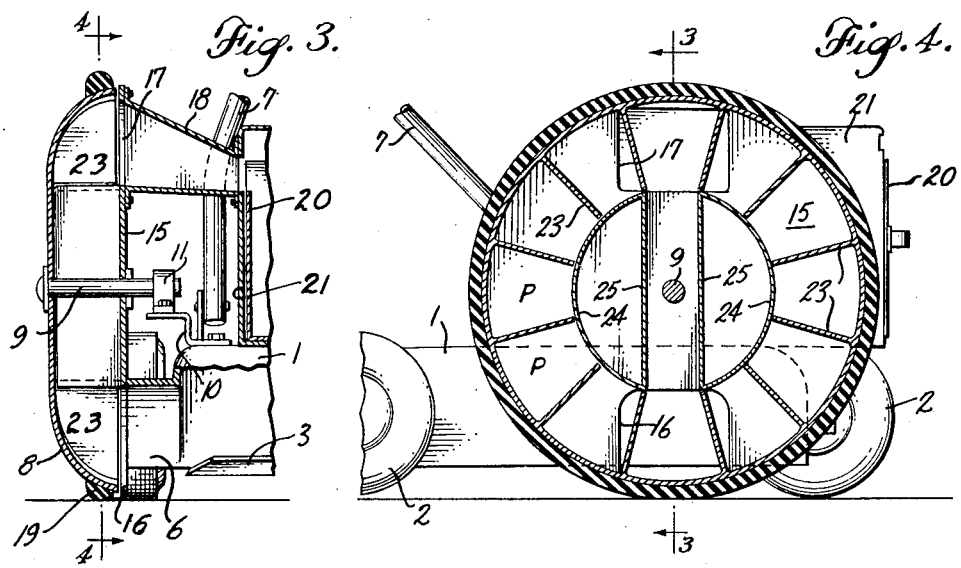
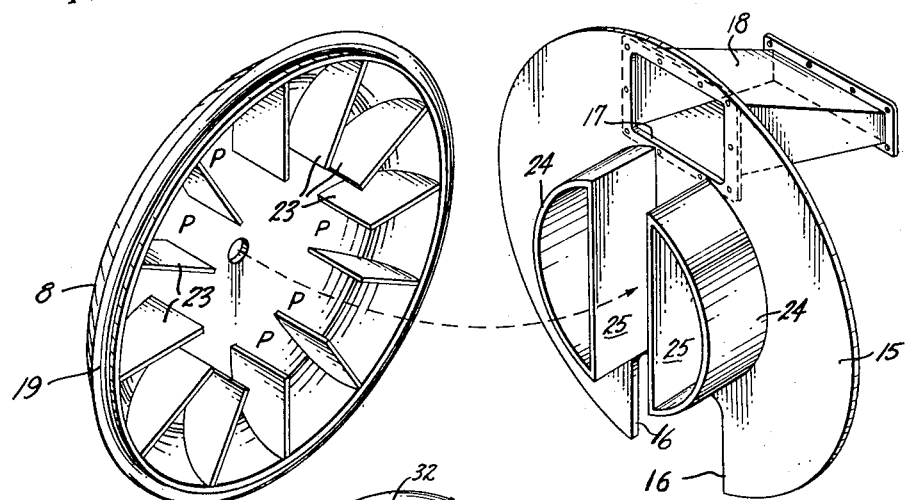
INVENTOR.
LAURENCE E. NICHOLSON
BY
Reynolds, Beach & Christensen
ATTORNEYS June 5, 1962 L. E. NICHOLSON 3,037,339
POWER LAWN MOWER GRASS CATCHER
Filed Jan. 26, 1959 3 Sheets-Sheet 3

INVENTOR.
LAURENCE E. NICHOLSON
BY
Reynolds, Beach & Christen
ATTORNEYS

United States Patent Office 3,037,339
Patented June 5, 1962

3,037,339
POWER LAWN MOWER GRASS CATCHER
Laurence E. Nicholson, Medical Dental Building,
Anacortes, Wash.
Filed Jan. 26, 1959, Ser. No. 789,008
16 Claims. (Cl. 56—25.4)

This invention pertains to a grass catcher particularly intended for use on power lawn mowers and more specifically on power lawn mowers of the type utilizing sickle blades rotating about a vertical axis. Normally, such lawn mowers discharge severed grass cuttings from the lower portion of the rotative blade housing in a generally tangential direction onto the lawn so that, particularly if the grass is fairly long when being cut, the grass cuttings strewn on the lawn do not present a neat appearance. This application is a continuation-in-part of my application Serial No. 706,640 filed January 2, 1958, for Power Lawn Mower Grass Catcher.

The principal object of the present invention is to provide a practical type of grass catcher for such power lawn mowers which will elevate the grass cuttings positively from the discharge aperture of the mower blade housing so that they can be collected easily.

An important object of the present invention is to provide mechanism for thus lifting the grass cuttings of a power lawn mower which is not principally dependent upon air flow and consequently it is unnecessary to provide special blower mechanism on the lawn mower or alter the configuration of the usual rotative sickle blades which do produce a substantial movement of air out of the grass discharge aperture. More specifically, it is an object to provide such mechanism in which it is only necessary for the air flow to move the grass cuttings substantially horizontally as they are propelled normally.

Despite the lack of necessity of providing special or supplemental blower means on the power lawn mower, it is an object to provide elevating mechanism for the grass cuttings which is able to lift the grass cuttings through a considerable distance and which distance is substantially independent of the velocity or volume of air blast produced by the power mower.

Another object is to provide a grass cutting receiving receptacle which is located conveniently, is of a capacity sufficiently large so that it is necessary to dump it only infrequently, and which is mounted in a position on the mower in which it does not hamper normal operation of the mower in any way.

It is also an object to provide grass catching mechanism which can be designed or adapted readily for use with most, if not all, power lawn mowers having grass cutting blades rotating about a vertical axis. Moreover, such grass catching mechanism can be designed as a component part of a new power mower or as an attachment which can be applied to a previously-manufactured mower.

Despite its effectiveness in catching grass from power mowers, with a minimum of upkeep and trouble, such grass catching mechanism is compact, of simple construction and inexpensive to manufacture.

In one form, the grass catcher can be disassembled quickly which enables it to be cleaned out readily in case any obstruction should lodge in the grass elevating mechanism.

In general, the grass catching mechanism preferably includes a rotor rotatively mounted alongside a power mower housing with the lower part of its marginal portion in registry with the usual grass discharge aperture in the side of the power mower housing. The marginal portion of the rotor contains grass elevating pockets into which the grass cuttings are blown from the mower housing and, as the rotor is turned, preferably by engagement of its periphery with the ground, such pockets are moved successively from a lower position in registry with the grass discharge aperture of the mower housing into an elevated position in registry with a delivery aperture. The grass cuttings are blown from the grass elevating pockets in such upper position through the delivery opening into a grass receptacle which may be mounted conveniently on the upper portion of the mower housing. The air vehicle for the grass cuttings is liberated from the grass receptacle through a strainer so that the grass cuttings will be deposited from the air stream into the receptacle while the air escapes.

FIGURE 3 is a vertical sectional view through a portion of the grass catcher taken transversely of the direction of mower movement, showing a modified type of grass catcher, which section is taken on line 3—3 of FIGURE 4.

FIGURE 4 is a vertical sectional view through the grass catcher rotor of the type shown in FIGURE 3 and taken on line 4—4 of that figure.

FIGURE 5 is a top perspective view of components of the grass catcher of the type shown in FIGURES 3 and 4, with the parts in separated relationship to disclose their construction and to indicate the manner in which they are assembled.

FIGURE 9 is a top perspective view of the grass elevating component of the grass catcher shown in FIGURES 6, 7 and 8.

Figure 1:
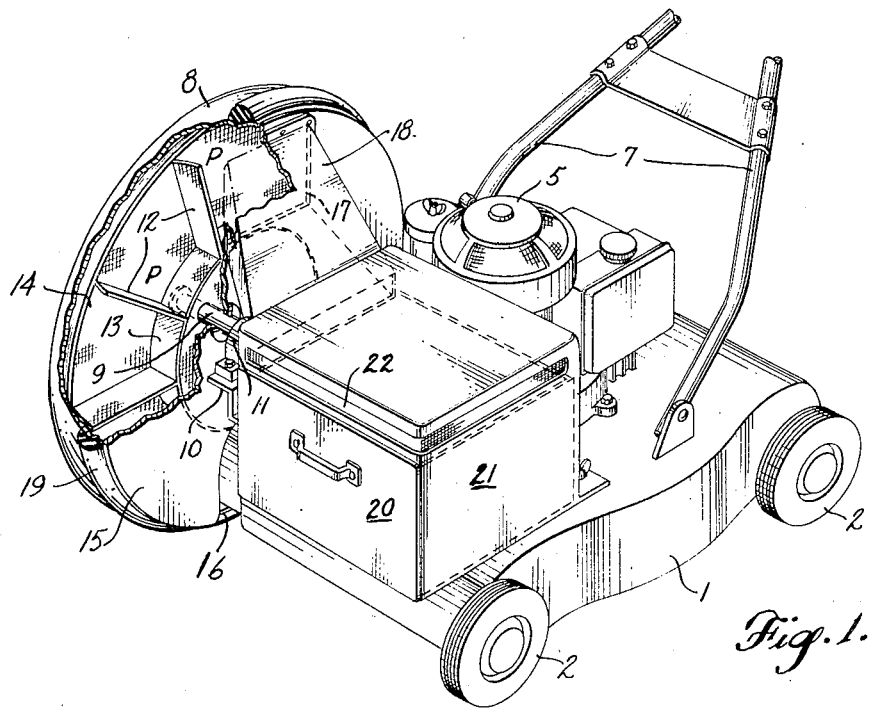
FIGURE 1 is a top perspective view of a representative power lawn motor to which the grass catcher has been applied, parts being broken away to show internal structure.

The representative lawn mower shown in the drawings includes a housing 1 normally supported for movement over the ground by wheels 2, one or more of which may be power-rotated as is customary. Such a wheel or wheels and a sickle type of cutter having blades 3, rotatable about the axis of a vertical shaft 4, are driven in conventional fashion by the internal combustion engine 5. Alternatively, the mower could be powered by an electric motor. As the mower travels over the ground, the rotative blades 3 cut the blades of grass and the severed portions are discharged through an opening 6 in housing 1, preferably arranged generally tangentially of the rotative path of the ends of blades 3. These blades are formed as fan blades, at least to some extent, to produce a reasonable current of air as the blades are rotated. The mower can be guided as desired by handles 7 having their lower ends secured to the housing 1. Mowers having these general characteristics and structural features of various makes are adapted for use with the grass catcher of the present invention.

Figure 2:
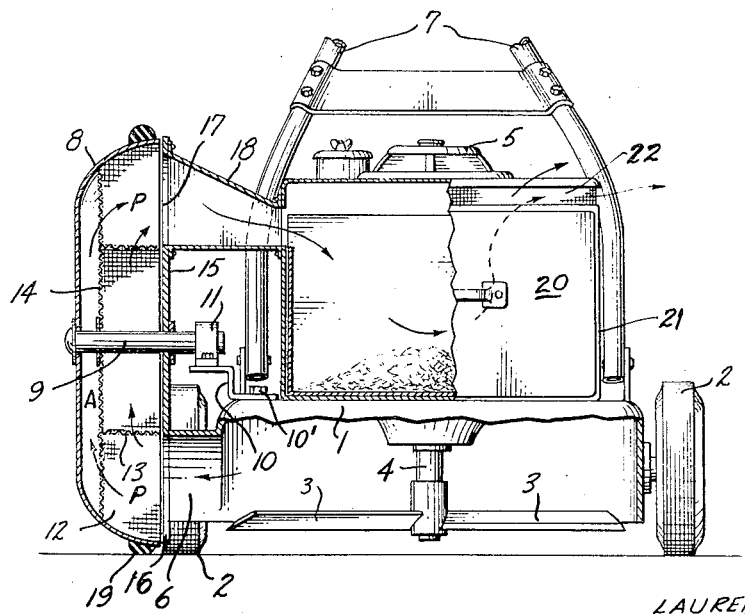
FIGURE 2 is a front elevation of a power lawn mower fitted with the grass catcher having parts broken away.

The grass-elevating mechanism of the present invention provides movable walls forming grass-carrying pockets for elevating grass cuttings positively from the discharge opening 6 of the mower housing to a position located a considerable distance above the mower housing from which the grass cuttings can be discharged along a substantially horizontal or perhaps somewhat downwardly or upwardly inclined path into a suitable collecting receptacle. Preferably such pockets are provided in a rotor. As illustrated in FIGURES 1 and 2 of the drawings, the rotor includes a rotary shell 8 mounted alongside the mower housing 1 by a shaft 9. One end of this shaft is supported from the mower housing by a bracket 10 carrying bearing 11. This bracket can be secured to the mower housing by a bolt 10′. The shaft 9 is thus mounted in cantilever fashion and the rotor shell 8 is secured upon its outer end, but an alternative arrangement could provide for mounting the shaft 9 stationarily and mounting the rotor shell 8 rotatively on it.

The rotor is located so that the lower part of its marginal portion is in registry with the aperture 6 for discharge of grass from the mower housing. The grass-elevating pockets of the rotor designated P in the drawings are arranged around its marginal portion, such pockets being formed between radial dividers constituting grass-elevating shelves. In the form of rotor shown in FIGURES 1 and 2, dividers 12 constitute the arms of a spider projecting radially outward from the spider hub or ring 13. The entire spider is made of multi-perforated material, such as screen of a mesh fine enough to prevent the grass from passing through the perforations. One side of the spider 12, 13 is disposed substantially flush with the rim of the rotor shell 8, and the opposite side of the spider is covered by a partition 14 of multi-perforated material, such as screen, which is disposed transversely of the rotative axis of the rotor. Such partition is spaced from the inner surface of shell 8 sufficiently to leave an adequate air passage as shown in FIGURE 2.

The open side of the rotor shell 8 is closed by a stationary closure means in the form of a plate 15, which is apertured for passage of shaft 9 through it and is anchored to the mower housing so that it will be held against rotation. The lower portion of this closure plate has in it a notch 16 of a size corresponding to the mower housing discharge aperture 6 and disposed in registry with it. In the upper portion of this closure plate is a delivery aperture 17 opening into a delivery conduit 18 which receives grass cuttings from pockets of the rotor which have moved upward from the discharge aperture 6 carrying the grass cuttings in them. The conduit 18, in conjunction with the shaft 9, may constitute the structure for supporting the closure plate and holding it against rotation with the rotor.

In order to elevate the grass cuttings, it is necessary to place them in a pocket P between spider dividers 12 and a section of the spider hub ring 13 in the lower portion of the rotor, and then turn the rotor about the axis of axle 9 until such pocket has been moved into a raised position and preferably one at the top of the rotor. The grass cuttings are blown into such a pocket in the lower part of the rotor by an air current produced by rotation of the blades 3. The air entering the rotor passes through the part of partition 14 in the rotor shell 8 which is in registry with such a pocket and the arcuate section of ring 13 forming the inner boundary of such pocket. The rotor is then rotated until this pocket is in registry with the delivery opening 17. Such rotation preferably is effected by contact of the rotor's periphery with the ground and for this purpose ground-gripping means such as a tire 19 may be provided about the circumference of the rotor shell 8 so that its lower portion is disposed approximately in the same plane as the lower portions of wheels 2.

During such upward movement of the pocket its open side is essentially sealed by the closure plate 15 so that there is no appreciable flow of air through such a filled pocket. Instead, air initially entering a pocket in the lowermost position with grass cuttings will follow the path of least resistance through the space A between the partition 14 and the inner surface of the rotor shell 8 and through the space within the hub ring 13 between the partition 14 and the closure plate 15.

As a pocket containing grass cuttings moves upward into registry with the delivery opening 17, the side of the pocket adjacent to the closure panel 15 will be opened again so that air flowing through the space between the partition 14 and the principal wall of the rotor will pass into the pocket through the portion of the partition in registry with such pocket, and air flowing through the interior of the spider hub ring 13 will enter the pocket through the arcuate inner wall of such pocket. Such air will blow the grass cuttings from the pocket through the delivery opening 17 into the conduit 18, thus emptying the pocket. Continued rotation of the rotor will then move that pocket downward again until it is again in registry with the discharge opening 6 for refilling.

It will be noted that the conduit 18 extends substantially horizontally from the delivery opening 17, and preferably even somewhat downward, so that, in the process of elevating the grass cuttings from the mower housing, the grass cuttings will be moved first substantially horizontally from the mower housing into the lower pocket and then, after such pocket has reached its upper discharge position, again substantially horizontally from the pocket outward through the delivery opening and into the conduit 18. The current to air, therefore, need not be sufficiently strong to elevate the grass cuttings against the force of gravity, but only strong enough to blow the cuttings horizontally first in one direction into the rotor and then in the opposite direction out of the rotor in the elevated position to which the pocket has been moved by rotation of the rotor.

It will be evident that, by rotation of the rotor in the manner described, grass cuttings contained within a pocket can be elevated to any extent desired within reasonable limits virtually independently of the force of the air flow. The distance that the grass cuttings are elevated should, however, be sufficient so that they can be moved substantially horizontally through the conduit 18 into a receptacle of adequate size which is supported above the mower housing. Such a receptacle is shown in FIGURES 1 and 2 as the box 20 slidably fitted into the casing 21. In such casing above the box is an air outlet aperture 22, covered by multi-perforated metal such as wire screen. While such opening could be directed in any direction, it is preferred that such opening be at the front or at the side or both of the casings 21 as shown in FIGURE 1. While the screen will tend to prevent passage through the discharge aperture of any grass cuttings which may be airborne, some fine particles may pass through the screen and, if the discharge aperture were in the top of the casing 21, such small particles might tend to fall on the motor 5 and be drawn into its air inlet. When the box 20 is full of grass, or a mowing operation has been completed, the box can easily be slid out of the casing by grasping the handle and emptied.

In FIGURES 3, 4 and 5, a somewhat different type of grass-elevating rotor arrangement is shown. The rotor still includes the shell 8 rotatively mounted on the axle 9 to be turned by engagement of the tire 19 with the ground. Also, the open side of the rotor is closed, as previously explained, by the closure plate 15 and grass cuttings are carried by an air current into the interior of the rotor through the mower housing discharge aperture 6. After being elevated by the rotor, the grass cuttings are delivered from the upper portion of the rotor through the aperture 17 into the conduit 18. From this conduit the grass cuttings are deposited in the box 20 in the casing 21 as described previously.

The difference in the rotor construction shown in these figures is the structure for forming the grass-elevating pockets in the rotor. In this instance, the dividers 23 are carried directly by the rotor shell, instead of radiating from a hub ring to form a spider as in the construction shown in FIGURES 1 and 2. Also, in this instance the dividers are shown as being of solid sheet material instead of being multi-perforated. Actually, the dividers 12 of the rotor shown in FIGURES 1 and 2 could also be of solid sheet material, as shown in FIGURES 3 and 5, provided that the partition 14, at least, is of multi-perforated material. Even the spider ring 13 could be of solid sheet material because, as discussed, air can flow through the passage between the multi-perforated partition 14 and the principal surface of the shell. No such partition is provided in the present rotor, however, so that no air flow passage alongside or behind the pockets is provided.

In this instance, the dividers extend over the full thickness of the rotor, as shown best in FIGURE 3. It is therefore necessary for the air flowing out of the pockets in their lowermost position to flow toward the center of the rotor and for such air to flow into the pockets in their uppermost position from the central portion of the rotor. In order to prevent the grass from falling out of the pockets during their upward movement as the rotor rotates and to channel the airflow as effectively as possible, a circular arcuate closure wall 24 at each side of the vertical central portion of the rotor is provided. These closure walls are mounted on the closure plate 15 as shown in FIGURE 5. Additional air passage walls 25 in spaced, parallel, vertical arrangement may be provided between the mower housing discharge aperture 6 and the delivery aperture 17. These walls also are carried by the closure plate 15 and conveniently may be joined to the opposite ends, respectively, of the arcuate closure walls 24 so as to form circular segments closed by the plate 15.

The adjacent ends of walls 24 and walls 25 preferably are spaced apart a distance substantially equal to the spacing of the inner ends of adjacent dividers 23, as shown in FIGURE 4. The walls 24 and 25, like the dividers 23, need not be perforated. In operation, a current of air produced by rotation of the knife blades 3 will carry the grass cuttings through the discharge aperture 6 into a pocket between adjacent dividers 23 in which the grass will be deposited while the air flows upward through the upright passage between walls 25. As the rotor rotates to carry the grass deposited in such a pocket to the top position in registry with the delivery aperture 17, air flowing up through the passage between walls 25 will support and carry the grass through the delivery aperture into the conduit 18.

While at the discharge location the air current must be sufficiently strong to prevent the grass cuttings from falling downward through the passage between walls 25 and clogging it, the air current need not be nearly as strong as would be required to lift the grass cuttings through such an upright passage without the positive elevating assistance afforded by the rotor pockets. From the conduit 18 the grass cuttings will be carried into the box 20 where they will be deposited while the air will escape from the casing 21, as previously described.

As an alternative, a hub ring of multi-perforated material, such as screen, could be provided to interconnect the inner ends of the dividers 23 of the type indicated at 13 in FIGURES 1 and 2. Such a ring would be of a size to encircle closely the arcuate walls 24, although such hub ring would eliminate the necessity for such walls. Such screening would prevent the grass cuttings from dropping out of the uppermost pocket when it reaches a position in registry with delivery opening 17 and, in that case, the air flowing upward between the walls 25 would not need to support the grass but only impel it horizontally from the pocket through the delivery opening into the conduit 18. In such a structure walls 25 also would be omitted. The current of air produced by the mower blades 3 could still escape from the lowermost pocket through its inner wall formed by an arc of the multi-perforated hub ring into the upright passage and enter the uppermost pocket through its inner perforated wall to blow the grass cuttings from such pocket.

In the forms of grass catcher described above, the rotary shell 8 is mounted for rotation about a definite axis established by the shaft 9. Such shaft serves to mount the rotary shell on the supporting bracket 10 as shown in FIGURES 1 and 2, and consequently it is necessary to dismount the bearing 11 from the bracket in order to remove the rotary shell or obtain access to its interior. As has been described, the pockets within the shell have been designed to hold the grass cuttings and lift them positively from a lowermost receiving position to an upper discharge position while the rotor as a whole is closed to define a passage for air entering a pocket in the lower position and discharged from a pocket in the upper position to move outward with it grass lifted to such position by the rotor pocket. During such operation, however, occasionally a foreign object or objects will be carried into such a pocket, for example leaves or sticks, which may obstruct the airflow sufficiently to hinder proper operation of the grass catcher in the manner described.

In order to be able to remove such foreign objects quickly from the interior of the rotary shell 8, it is desirable for it to be demountable without the necessity of disconnecting a supporting shaft. In the construction shown in FIGURES 6 to 9, inclusive, the rotary shell 8 is not mounted on a shaft for rotation about a fixed axis but is received floatingly within a cage formed by cross bands including the horizontal U-shaped band 26 having its opposite ends secured to the stationary closure plate 15 and an upright band 27 supported by and crossing the band 26. Preferably the central portion of the upright band is welded to the central portion of the band 26. The spacer portions of the band 26 are of a length just slightly greater than the depth of the rotary shell 8, and the length of the band 26 is just slightly greater than the diameter of such shell.

The bands 26 and 27 confine the outer side of the rotary shell 8 and guide it for rotation. Ball thrust bearings 28 carried by the bands 26 and 27 in spaced relation, preferably near the opposite ends of bands 27 and near the bent portions of bands 26, are engageable by the outer wall of the shell and serve as thrust bearings limiting outward movement of the shell. The bent end portions of the band 26 may also serve as supports to limit the downward movement of the shell. Thus such bent portions carry ball thrust bearings 29, which opposite thrust bearings are spaced apart a distance just slightly less than the diameter of the shell. Such thrust bearings prevent the shell from passing downward between the bent portions of the band 26, therefore, and such thrust bearings 29 will limit downward movement of the shell in a predetermined limiting position without appreciably deterring rotation of the shell.

Figures 6, 7, 8:
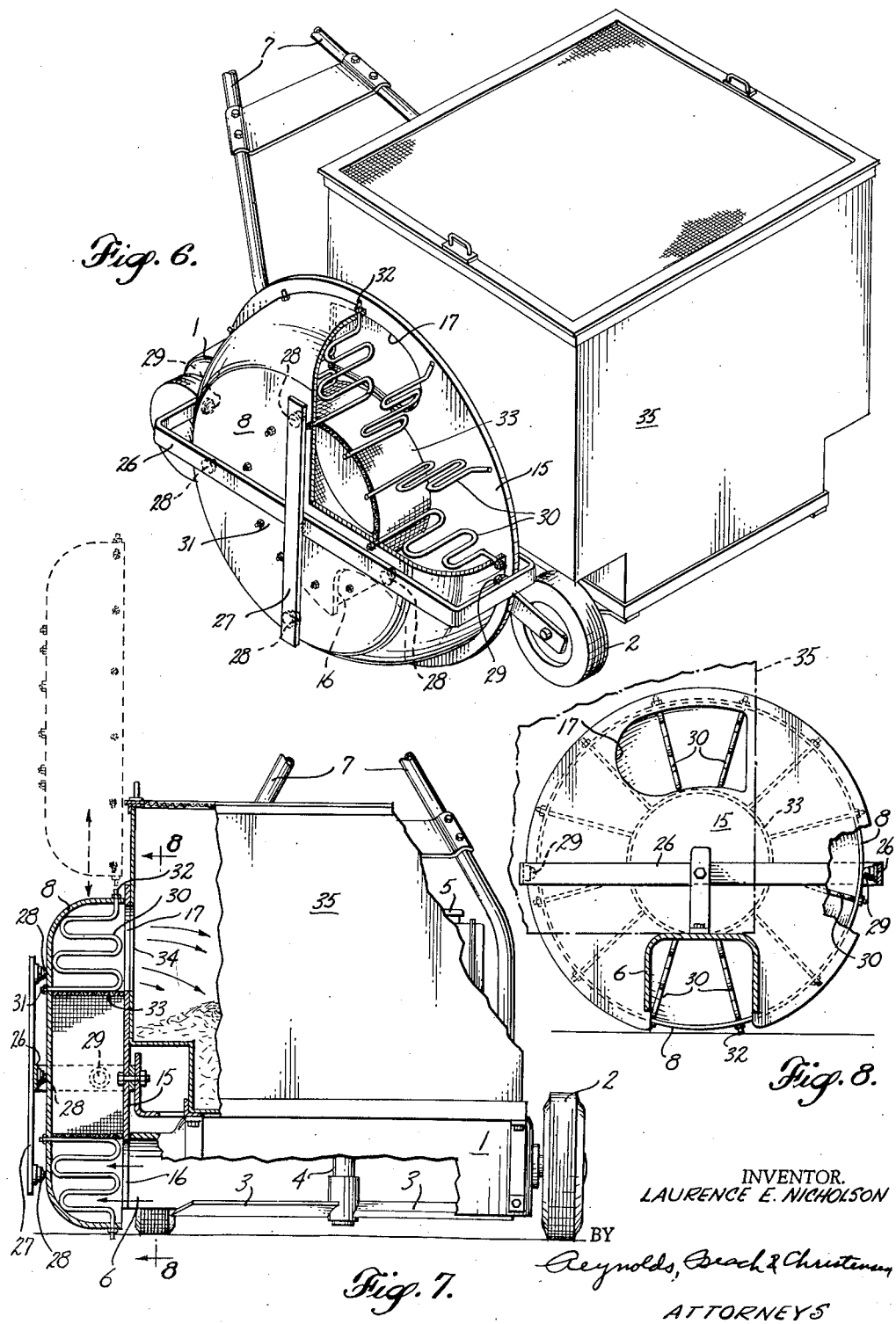
FIGURE 6 is a top perspective view of another modification of the grass catcher with parts broken away.
FIGURE 7 is a front elevation view of the grass catcher structure shown in FIGURE 6, parts being broken away.
FIGURE 8 is a vertical sectional view taken on line 8—8 of FIGURE 7.

In assembling the rotary shell 8 on the motor, it is merely necessary to lower it downward from the broken line position shown in FIGURE 7 into the solid line position shown in that figure. The shell can be moved downward until the lower portion of its periphery rests upon the ground in which position the sides of the shell should be just clear of the side thrust bearings 29. If the rotary shell should pass over a depression or the lawn mower tipped away from the grass catcher side, the rotary shell will slide downward until it hangs on the side thrust bearings 29. Conversely, if the shell should pass over a hump in the ground or the mower should be tilted toward the grass catcher, the rotary shell would be lifted freely upward to whatever extent might be necessary by the ground contact while still being confined by the backing thrust bearings 23. The rotary shell could not move edgewise appreciably without contacting one or the other of the side thrust bearings 29 which would limit such edgewise movement.

The internal structure of the rotary shell 8 as well as its mounting differs somewhat from the corresponding structures of the rotary shells described previously. In this instance, the dividers 30 extending radially of the shell's interior which define the grass-carrying pockets are formed of wire bent in serpentine fashion. The convolutions of these dividers are disposed sufficiently close together to define shelves which will support and elevate the grass cuttings from a lower position into an upper position. Such convolutions can be spaced rather far apart, however, because the grass will mat sufficiently to be supported by the dividers. Such dividers preferably are secured in place by having radial and axial ends extending through the shell. At least one of these ends is then secured by a nut screwed onto the threaded end of the wire or by securing the end permanently such as by welding it to the shell or by riveting it.

The axially disposed ends 31 of the several dividers are arranged in a circle having its center at the center of the rotary shell. The radially disposed ends 32 preferably project a substantial distance beyond the periphery of the shell so that they will engage and grip the ground over which the mower passes to rotate the shell positively. Each divider can be inserted into the shell by passing its radial end 32 through a shell aperture and then tilting the divider in a radial plane to move the end 31 into the shell until it passes through the shell. If the axial end 31 is secured in this position, the wire 30 should be sufficiently stiff so that endwise pressure on the radial end 32 could not easily press such end into the shell and the divider would thus be held in place. Alternatively, if only the end 32 were secured, the divider should be held in some way against being tilted in a radial plane and preferably the wire of the divider would have sufficient resilience so that the end 31 needs to be deflected somewhat toward the perimeter of the rotary shell in order to be inserted through the shell aperture receiving it. The resilience of the wire would then hold this end in place.

The axially extending portions of the dividers 30 nearest the center of the shell 8 should be substantially parallel and are arranged around a central cavity of circular cross section. Into this cavity is inserted a cylindrical hub or ring 33 of multi-perforated material such as wire mesh which preferably is of a size so that its periphery fits snugly against the inner axial portions of the dividers 30. Such hub member 33 can be held in such position simply by the frictional engagement between it and the inner edges of the dividers 30. Moreover, when the shell is in place between the confining bands 26 and 27 on its outer side and the closure plate 15 on its inner side, the open side of the shell will be held closely adjacent to the closure plate so the dividers and hub could not move appreciably outwardly.

When the rotary shell 8 is lowered into the cage formed by the bands 26 and 27, the lower portion of the shell will move downward until a pocket or pockets is in registry with the opening 16 in the closure plate 15 at the discharge end of the passage 6 from the casing of mower 1. Normally, the lower side of the rotary shell would rest on the ground and the ends of the radial wires 32 would dig into the ground to effect rotation of the shell. A lower pocket would thus be moved upward into registry with the discharge aperture 17 in the closure plate 15 which is in registry with an aperture 34 in the wall of a grass receptacle 35. This receptacle is larger than the receptacle shown in the modifications described above.

As the mower is operated, the cut grass discharged through the passage 6 and opening 16 into pockets between the dividers 30 will be carried from a location in registry with the aperture 16 upward into a location in registry with the discharge aperture 17. There will be some tendency for the air moved by the mower blades 3 to spread sidewise within the rotor, but grass matted against the dividers at both sides of the pocket would tend to prevent circumferential air movement. Most of the air, therefore, would pass through the wall of the hub ring 33 in a generally radial direction. Such air would be confined within the central portion of the shell because of the closed outer wall and the closely adjacent closure plate 15, except for the portion of the multi-perforated hub 33 located adjacent to the discharge aperture 17.

A current of air would thus be produced from the mower casing which would carry the grass cuttings into pockets at the lower portion of the shell and such air would then pass through the hub wall and move upward through the central portion of the shell and the upper portion of the hub. Air passing through the upper portion of the hub would move through the discharge aperture 17 and simultaneously expel grass from the upper pockets through the apertures 17 and 34 into the receptacle 35. This receptacle would have in its upper portion, preferably in the cover, an opening closed by a fine screen through which the air would escape. It will be noted that the top of the receptacle is disposed considerably above the upper edges of the discharge aperture 17 and receptacle aperture 34, but it has been found that the current of air produced by the mower blades 3 of conventional structure is sufficient to carry grass from the upper pockets into the receptacle at an elevation actually above the upper edges of such apertures. It is therefore possible to increase the capacity of the receptacle shown in FIGURES 1 and 2 to a volume like that of the receptacle shown in FIGURES 6 and 7, for example, without increasing correspondingly the size of the grass elevating shell 8. The opening 34 should, however, be located a substantial distance above the bottom of the receptacle because additional grass cannot be discharged into the receptacle through the opening 34 if grass next to such opening covers it.

If some obstruction such as leaves or a stick should lodge in a pocket and block the airflow described above appreciably, the entire rotary shell 8 can simply be lifted upward into the broken line position shown in FIGURE 7, thus removing it completely from the mower. The interior of the shell is thus immediately accessible to be cleaned out, after which it can be replaced simply by dropping it back into position behind the bands 26 and 27 as described previously.

I claim as my invention:

1. Grass-elevating mechanism for a power lawn mower comprising a circular rotor shell having an upright imperforate side and shelves within said shell defining grass-elevating pockets arranged around its marginal portion for rotation therewith, means holding said rotor shell with its imperforate side disposed remote from the mower and its other side adjacent to the mower, said rotor shell being rotatable relative to the mower to move said grass-elevating pockets from a lower grass-receiving position into an upper grass-delivering position, closure means, and means supporting said closure means adjacent to the side of said rotor shell next to the mower and cooperating with said shell to confine air from the mower entering said shell through a pocket in lower grass-receiving position for discharge from said shell through a pocket in upper grass-delivering position to blow the grass from such pocket in such upper grass-delivering position.

2. Grass-elevating mechanism for a power lawn mower comprising a circular rotor shell having a closed side and an open side and shelves within said shell defining grass-elevating pockets arranged around its marginal portion for rotation therewith, means holding said rotor shell with its closed side disposed remote from the mower and its open side adjacent to the mower, said rotor shell being rotatable relative to the mower by the rotor periphery rolling along the ground as the mower is moved over the ground to move said grass-elevating pockets from a lower grass-receiving position into an upper grass-delivering position, stationary closure means, and means supporting said stationary closure means adjacent to the open side of said rotor shell and cooperating with said shell to confine air from the mower entering said shell through a pocket in lower grass-receiving position for discharge from said shell through a pocket in upper grass-delivering position to blow the grass from such pocket in such upper grass-delivering position.

3. Grass-elevating mechanism for a power lawn mower having a housing from which cut grass is blown through a discharge aperture in the housing, said grass-elevating mechanism comprising a circular rotor shell having a closed side and an open side and grass-elevating means inwardly from its marginal portion, means holding said rotor shell with its closed side disposed remote from the mower and its open side adjacent to the mower, said rotor shell being rotatable relative to the mower to move said grass-elevating means from a lower grass-receiving position in registry with the mower's grass discharge aperture into an elevated grass-delivering position, stationary closure means, and means supporting said stationary closure means adjacent to the open side of said rotor shell supported from the mower and cooperating with said shell to confine air from the mower entering said shell through said grass-elevating means in lower grass-receiving position for discharge from said shell through said grass-elevating means in elevated grass-delivering position to blow grass from said grass-elevating means in such grass-delivering position.

4. The grass-elevating mechanism defined in claim 3, and means supporting the rotor shell from the mower housing and guiding it for rotation about a generally horizontal axis including a cantilever axle mounted on the mower housing and supporting the rotor shell with its periphery in engagement with the ground for rotation relative to the mower by rolling along the ground as the mower is moved over the ground.

5. Grass-elevating mechanism for a power lawn mower having a housing from which cut grass is blown through a discharge aperture in the housing, said grass-elevating mechanism comprising a circular rotor shell having a closed side and an open side and grass-elevating pockets within the marginal portion of said shell, means holding said rotor shell with its closed side disposed remote from the mower and its open side adjacent to the mower, said rotor shell being rotatable relative to the mower to move said grass-elevating pockets from a lower grass-receiving position in registry with the mower's grass discharge aperture into an elevated grass-delivering position, a stationary closure plate, and means supporting said stationary closure plate adjacent to the open side of said rotor shell and cooperating with said shell to confine air from the mower entering said shell through a pocket in lower grass-receiving position for discharge from said shell through a pocket in elevated grass-delivering position to blow grass from such pocket in such elevated grass-delivering position.

6. The grass-elevating mechanism defined in claim 5, in which the rotor shell has radial dividers in its marginal portion forming the grass-elevating pockets.

7. The grass-elevating mechanism defined in claim 6, in which the radial dividers constitute the arms of a spider and the spider includes a ring of multi-perforated material connecting the inner ends of the dividers and forming the inner ends of the pockets.

8. The grass-elevating mechanism defined in claim 6, and a ring of multi-perforated material located concentrically within the rotor shell and having its periphery disposed adjacent to the inner ends of the dividers and forming the inner ends of the pockets.

9. The grass-elevating mechanism defined in claim 6, and a partition of multi-perforated material disposed substantially parallel to the closed side of the rotor shell and between the closed side of the rotor shell and the adjacent radial edges of the radial dividers, forming an air passage between said partition and the closed side of the rotor shell.

10. The grass-elevating mechanism defined in claim 6, in which the radial dividers are imperforate and extend from the inner periphery of the rotor shell inward.

11. The grass-elevating mechanism defined in claim 6, and stationary arcuate walls carried by the stationary closure plate and disposed adjacent to the inner ends of the radial dividers and between the mower's discharge aperture and the elevated grass delivering position, for closing the inner ends of the rotor pockets during their upward movement toward their elevated grass-delivering position.

12. The grass-elevating mechanism defined in claim 11, and spaced upright walls carried by the stationary closure plate, extending between the mower's grass discharge aperture and the elevated grass-delivering position of the pockets and forming a passage for air moving upwardly through the rotor shell from the mower's grass discharge aperture to a pocket in elevated grass-delivering position.

13. The grass-elevating mechanism defined in claim 6, in which the radial dividers are serpentine wires and include an outer portion extending radially outward through the periphery of the rotor shell and an inner portion extending axially through the closed side of the rotor shell.

14. Grass-elevating mechanism for a power lawn mower comprising a circular rotor shell having a closed side and an open side and shelves within said shell defining grass-elevating pockets arranged around its marginal portion for rotation therewith, means holding said rotor shell with its closed side disposed remote from the mower and its open side adjacent to the mower and limiting fore and aft edgewise movement of the rotor shell, but said rotor shell being unrestrained for upward movement and being rotatable relative to the mower by rolling along the ground as the mower is moved over the ground to move said grass-elevating pockets from a lower grass-receiving position into an upper grass-delivering position, closure means, and means supporting said closure means adjacent to the open side of said rotor shell and cooperating with said shell to confine air from the mower entering said shell through a pocket in lower grass-receiving position for discharge from said shell through a pocket in upper grass-delivering position for movement of air from the mower upward to blow the grass from a pocket in such upper grass-delivering position.

15. Grass-elevating mechanism for a power lawn mower comprising a circular rotor shell having an upright imperforate side and shelves within said shell defining grass-elevating pockets arranged around its marginal portion for rotation therewith, means supported from the mower and guiding said rotor shell for rotation about its axis relative to the mower with said imperforate rotor shell side disposed remote from the mower, such rotation of said rotor shell lifting said pockets from a lower grass-receiving position into an upper grass-delivering position, closure means, and means supporting said closure means adjacent to the side of said rotor shell next to the mower, said closure means confining air within said rotor shell for flow from the mower between a pocket in lower grass-receiving position and a pocket in upper grass-delivering position by-passing the pockets filled with grass between such lower and upper positions to blow the grass from such pocket in such upper grass-delivering position.

16. Grass-elevating mechanism for a power lawn mower comprising a plurality of grass-elevating pockets formed by a plurality of radiating, rotatively movable dividers, arcuate wall means located radially inwardly from said dividers defining the radially inner walls of pockets containing grass, rotative means mounting said dividers, closing said pockets at one axial side and lifting said dividers successively from a lower position in which the pockets receive grass cuttings from the lawn mower into an elevated position for delivery of the grass cuttings from said pockets, and means closing the other axial side of said pockets and providing a lower, grass-receiving opening and an upper grass-delivering opening, air from the mower entering said grass-elevating means through such a pocket in lower grass-receiving position and moving into such a pocket in elevated grass-delivering position and out of such elevated pocket carrying out with it the grass in such pocket.

References Cited in the file of this patent

UNITED STATES PATENTS

| | | |
|---|---|---|
| 1,550,948 | Clausen | Aug. 25, 1925 |
| 2,617,347 | Provost | Nov. 11, 1952 |
| 2,701,942 | Caldwell et al. | Feb. 15, 1955 |
| 2,783,604 | Cahill | Mar. 5, 1957 |